(12) United States Patent
Davayat et al.

(10) Patent No.: US 11,607,912 B2
(45) Date of Patent: Mar. 21, 2023

(54) STRAIGHT PLY AND ANGLE PLY COMPRISING METALLIC MONOFILAMENTS

(71) Applicant: COMPAGNIE GENERALE DES ETABLISSEMENTS MICHELIN, Clermont-Ferrand (FR)

(72) Inventors: Gaëtan Davayat, Clermont-Ferrand (FR); Cedric Chauvet, Clermont-Ferrand (FR); Eric Colin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 876 days.

(21) Appl. No.: 16/304,848

(22) PCT Filed: May 5, 2017

(86) PCT No.: PCT/FR2017/051093
§ 371 (c)(1),
(2) Date: Nov. 27, 2018

(87) PCT Pub. No.: WO2017/203119
PCT Pub. Date: Nov. 30, 2017

(65) Prior Publication Data
US 2020/0324577 A1 Oct. 15, 2020

(30) Foreign Application Priority Data

May 27, 2016 (FR) ..................... 1654766

(51) Int. Cl.
*B60C 9/00* (2006.01)
*B29D 30/38* (2006.01)
*B21F 7/00* (2006.01)

(52) U.S. Cl.
CPC .............. *B60C 9/0007* (2013.01); *B21F 7/00* (2013.01); *B29D 30/38* (2013.01); *B60C 9/0064* (2013.01);
(Continued)

(58) Field of Classification Search
CPC .......... B60C 9/0064; B60C 2009/2074; B60C 2009/2252
See application file for complete search history.

(56) References Cited

U.S. PATENT DOCUMENTS

| 5,198,307 A | 3/1993 | Bourgois et al. |
| 6,273,161 B1* | 8/2001 | Yamagami ............ B60C 9/0007 |
| | | 152/451 |

(Continued)

FOREIGN PATENT DOCUMENTS

| EP | 2047962 A1 | 4/2009 |
| JP | 8-295102 | * 11/1996 |

(Continued)

OTHER PUBLICATIONS

Machine translation of JP 8-295102, 1996.*

(Continued)

*Primary Examiner* — Justin R Fischer
(74) *Attorney, Agent, or Firm* — Venable LLP

(57) ABSTRACT

A ply (16, 18) comprises metallic monofilaments (46', 46"). Each monofilament (46') of a first group has a positive torsional elastic deformation in a first direction about its main axis (G). Each monofilament (46") of a second group has a negative torsional elastic deformation in a second direction about its main axis (G). The absolute value of the torsional elastic deformation C of each monofilament (46', 46") is such that |C|≤6 turns per ten metres. The mean S of the torsional elastic deformations of the monofilaments (46', 46") of the ply (16, 18) is such that −0.25 turn per ten (Continued)

metres≤S≤+0.25 turn per ten metres. The monofilaments (46', 46") are arranged next to one another so as to alternate one or more monofilaments (46') of the first group with one or more monofilaments (46") of the second group.

11 Claims, 4 Drawing Sheets

(52) U.S. Cl.
 CPC ............. *B60C 2009/0078* (2013.01); *B60C 2009/0092* (2013.01)

(56) References Cited

U.S. PATENT DOCUMENTS

| | | |
|---|---|---|
| 7,878,788 B2 | 2/2011 | Januet |
| 2009/0098236 A1 | 4/2009 | Januet |
| 2010/0229614 A1* | 9/2010 | Tyl ........................ B21F 1/02 72/162 |
| 2014/0116587 A1 | 5/2014 | Ueda et al. |
| 2015/0007922 A1 | 1/2015 | Lardjane et al. |
| 2015/0013873 A1 | 1/2015 | Lardjane et al. |
| 2016/0368321 A1 | 12/2016 | Zhang |
| 2018/0297408 A1 | 10/2018 | Zhang |

FOREIGN PATENT DOCUMENTS

| | | | |
|---|---|---|---|
| JP | 2001-032183 | * | 2/2001 |
| WO | 2013/117476 A1 | | 8/2013 |
| WO | 2013/117477 A1 | | 8/2013 |
| WO | 2015/014510 A2 | | 2/2015 |
| WO | WO-2015014510 A2 * | 2/2015 | ........... B60C 9/0064 |

OTHER PUBLICATIONS

International Search Report dated Jul. 31, 2017, in corresponding PCT/FR2017/051093 (4 pages).

Y. De Zong, "Production Status and Development Trend of Steel Cord for All-Steel Radial Tyre", Tire Industry, vol. 22, No. 10, pp. 579-581 (2002) with English summary.

* cited by examiner

STRAIGHT PLY AND ANGLE PLY COMPRISING METALLIC MONOFILAMENTS

BACKGROUND

The invention relates to a straight ply, an angle ply, a tyre comprising such plies and also processes for manufacturing such plies. The invention applies to tyres of any type, whether they are of pneumatic or non-pneumatic type. A pneumatic tyre is understood to mean a tyre intended to form a cavity by cooperating with a support element, for example a rim, this cavity being able to be pressurized to a pressure greater than atmospheric pressure. In contrast, a non-pneumatic tyre is not able to be pressurized.

A pneumatic tyre for a passenger vehicle comprising a carcass reinforcement that is anchored in two beads and surmounted radially by a crown reinforcement that is itself surmounted by a tread that is joined to the beads by two sidewalls is known from the prior art.

In such a pneumatic tyre, the crown reinforcement comprises a hoop reinforcement and a working reinforcement. The hoop reinforcement is radially interposed between the tread and the working reinforcement.

The working reinforcement comprises two working plies each comprising a polymer matrix, for example based on natural rubber, and several reinforcing elements embedded in the elastomer matrix. Each working ply extends along a main direction, this main direction being, within the tyre, coincident with the circumferential direction of the tyre.

The reinforcing elements of each working ply are arranged side by side and make an angle ranging from 10° to 40°, preferably ranging from 20° to 30°, with the main direction of the ply. Due to this angle, these working plies are referred to as angle plies in contrast to straight plies in which the reinforcing elements make an angle strictly of less than 10°, preferably of less than 5°, with the main direction of the ply.

The reinforcing elements of each working ply are crossed from one working ply to the other. Each reinforcing element consists of a metallic monofilament having a diameter equal to 0.30 mm as is described in documents WO 2013/117476 and WO 2013/117477.

These working plies in particular have the primary function of giving the tyre high stiffness or drift thrust or cornering which, in a known manner, is necessary for achieving good road holding ("handling") on the motor vehicle. Other performances are also linked to the proper functioning of the working plies, such as the rolling resistance, the high-speed endurance or else the breaking energy, for example.

In order to manufacture these plies, a calendering step is carried out during which the metallic monofilaments are arranged next to one another and these metallic monofilaments are embedded in the polymer matrix. This step is generally referred to as a calendering step.

Several strips are then cut from the straight ply so as to obtain a plurality of strips each extending along a main direction and in which the metallic monofilaments of each strip make an angle of between 10° and 40° with the main direction of each strip. Next, the ends of the strips obtained previously are joined in twos so as to obtain the angle ply in which the metallic monofilaments make an angle of between 10° and 40° with the main direction of the angle ply.

However, each metallic monofilament has a torsional elastic deformation generating a torsional torque about its main axis which may be relatively high, for example corresponding to a deformation of the order of several turns per ten metres of metallic monofilament.

Once arranged next to one another, an undesirable coiling of the straight ply, also referred to as curling, and/or an undesirable waviness of the straight ply are observed. This undesirable coiling and/or this undesirable waviness make the subsequent steps of handling the straight ply, of manufacturing the angle ply and of making the tyre relatively difficult.

SUMMARY

The objective of the invention is to reduce or even eliminate the undesirable coiling and/or undesirable waviness of a ply comprising metallic monofilaments as reinforcing elements.

To this end, one subject of the invention is a ply extending along a main direction, comprising:
  a polymer matrix,
  metallic monofilaments embedded in the polymer matrix, the metallic monofilaments being substantially parallel relative to one another and to the main direction of the ply, each metallic monofilament having a main axis and a torsional elastic deformation about its main axis,
the ply comprising first and second groups of metallic monofilaments, each metallic monofilament of the first group having a torsional elastic deformation in a first direction about its main axis, each metallic monofilament of the second group having a torsional elastic deformation in a second direction about its main axis, the first direction being opposite to the second direction, and it being understood that the torsional elastic deformation is positive in the first direction and negative in the second direction, the metallic monofilaments being such that:
  the absolute value of the torsional elastic deformation C of each metallic monofilament is such that $|C| \leq 6$ turns per ten metres of metallic monofilament, and
  the mean S of the torsional elastic deformations of the metallic monofilaments of the ply is such that $-0.25$ turn per ten metres of metallic monofilaments $\leq S \leq +0.25$ turn per ten metres of metallic monofilaments,
the metallic monofilaments being arranged next to one another so as to alternate one or more metallic monofilaments of the first group with one or more metallic monofilaments of the second group.

The main direction of the straight ply according to the invention is the general direction along which the longitudinal edges of the ply extend. In the straight ply according to the invention, the metallic monofilaments are substantially parallel to one another and to the main direction. It is then referred to as a straight ply since each monofilament is substantially parallel to the longitudinal edges of the ply.

By means of the relatively low torsional elastic deformations of each metallic monofilament, the alternation of the metallic monofilaments, and the relatively low mean of the torsional elastic deformations of all of the metallic monofilaments, the straight ply according to the invention makes it possible to prevent undesirable coiling and/or undesirable waviness. Specifically, by alternating over the width of the ply metallic monofilaments of the first group and metallic monofilaments of the second group, the torsional torque that the metallic monofilaments apply locally to the polymer matrix, and which induces the undesirable coiling and/or undesirable waviness, is distributed. Thus, the torsional elastic deformation of the metallic monofilaments of one group is compensated for by the torsional elastic deformation of the metallic monofilaments of the other group.

Moreover, the relatively low torsional elastic deformation of each metallic monofilament makes it possible to arrange one or more metallic monofilaments of the same group one after the other without this creating undesirable coiling and/or undesirable waviness This gives a relative freedom of arrangement of the metallic monofilaments during the ply manufacturing process.

In accordance with the invention, the torsional elastic deformation is positive when the torsion is in the first direction whereas the torsional elastic deformation is negative when the torsion is in the second direction. In one convention, it could be agreed that the first direction is the clockwise direction and that the second direction is the anticlockwise direction. In another convention, it could be agreed that the first direction is the anticlockwise direction and that the second direction is the clockwise direction.

The torsional elastic deformation is measured over a given length of metallic monofilament, for example a length ranging from 5 to 10 m and the value found is expressed relative to 10 m in order to obtain the torque C. In order to do this, a very long table is provided, the length of the table being at least equal to the length of the metallic monofilament of which the torsional elastic deformation is measured, and one end of the metallic monofilament is fastened to one end of the table. The metallic monofilament is unwound taking great care to hold the metallic monofilament in order to prevent it from rotating on itself about its main axis. At the other end, the metallic monofilament is hung at the edge of the table and a rod is fastened to its end perpendicularly to the main axis of the metallic monofilament. Then, the hanging end of the metallic monofilament is allowed to rotate. The number of turns that the rod makes is then measured. If the rod makes an incomplete turn, the angle made over this turn is related to the non-whole value of this turn. Thus, for an angle of 180°, there will be a 0.5 turn.

The term "metallic monofilament" is understood to mean a monofilament made from a metallic material, this material possibly consisting of a metallic core and optionally one or more metallic or nonmetallic coating layers. Such coating layers may for example be a layer of brass, a layer of an adhesive composition or else a layer of an adhesion primer. Such a metallic monofilament is straight, i.e. its main axis describes a substantially rectilinear trajectory when it is held under low tension. In other words, it is not preformed, has no helix or wave shape and is not assembled (in contact) with another metallic monofilament. A monofilament is a single filament and not an assembly of several filaments.

The term "absolute value" is understood to mean the absolute value in the mathematical sense, i.e. if C is positive, the absolute value of C is C and if C is negative, the absolute value of C is −C.

The term "mean" is understood to mean the arithmetic mean of the individual elastic deformation values measured over 10 cm of ply along the direction substantially perpendicular to the metallic monofilaments.

Another subject of the invention is a ply extending along a main direction, comprising:
 a polymer matrix,
 metallic monofilaments embedded in the polymer matrix, the metallic monofilaments being substantially parallel relative to one another and making an angle of between 10° and 40° with the main direction of the ply, each metallic monofilament having a main axis and a torsional elastic deformation about its main axis,
the ply comprising first and second groups of metallic monofilaments, each metallic monofilament of the first group having a torsional elastic deformation in a first direction about its main axis, each metallic monofilament of the second group having a torsional elastic deformation in a second direction about its main axis, the first direction being opposite to the second direction, and it being understood that the torsional elastic deformation is positive in the first direction and negative in the second direction, the metallic monofilaments being such that:
 the absolute value of the torsional elastic deformation of each metallic monofilament is such that $|C| \leq 6$ turns per ten metres of metallic monofilament, and
 the mean S of the torsional elastic deformations of the metallic monofilaments of the ply is such that $-0.25$ turn per ten metres of metallic monofilaments S+0.25 turn per ten metres of metallic monofilaments,
the metallic monofilaments being arranged next to one another so as to alternate one or more metallic monofilaments of the first group with one or more metallic monofilaments of the second group.

Just like in the preceding embodiment, the main direction of the angle ply according to the invention is the general direction along which the longitudinal edges of the ply extend. In the angle ply according to the invention, the metallic monofilaments are substantially parallel to one another and make an angle of between 10° and 40° with the main direction of the ply. It is then referred to as an angle ply since each metallic monofilament forms an angle greater than or equal to 10° with the longitudinal edges of the ply. The term "absolute value" is understood to mean the absolute value in the mathematical sense, i.e. if C is positive, the absolute value of C is C and if C is negative, the absolute value of C is −C. The term "mean" is understood to mean the arithmetic mean of the individual elastic deformation values measured over 10 cm of ply along the direction substantially perpendicular to the metallic monofilaments.

Just like in the preceding embodiment, the relatively low torsional elastic deformations of each metallic monofilament, the alternation of the metallic monofilaments, and the relatively low mean of the torsional elastic deformations of all of the metallic monofilaments make it possible to prevent undesirable coiling and/or waviness of the angle ply according to the invention.

Advantageously, the metallic monofilaments are such that the absolute value of the torsional elastic deformation of each metallic monofilament is such that $|C| \leq 5$ turns per ten metres of metallic monofilament. Thus, in addition to preventing the undesirable coiling and/or waviness, the passage of the metallic monofilaments through the calender for manufacturing the ply is facilitated.

Advantageously, each metallic monofilament has a diameter ranging from 0.10 mm to 0.50 mm, preferably ranging from 0.20 mm to 0.40 mm and more preferentially ranging from 0.25 mm to 0.35 mm.

Preferably, the core is made of steel that may have a pearlitic, ferritic, austenitic, bainitic or martensitic microstructure or a microstructure resulting from a mixture of these microstructures.

Preferably, the steel comprises a carbon content ranging from 0.2% to 1% by weight and more preferentially from 0.4% to 0.9% by weight. Preferably, the steel comprises a manganese content ranging from 0.3% to 0.7% by weight, a silicon content ranging from 0.1% to 0.3% by weight, a phosphorus content ranging at most up to 0.045%, limit included, by weight, a sulfur content ranging at most up to 0.045%, limit included, by weight and a nitrogen content ranging at most up to 0.008%, limit included, by weight. Optionally, the steel comprises at most 0.1%, limit included, preferably 0.05%, limit included, and more preferentially 0.02%, limit included, by weight of vanadium and/or molybdenum.

In one embodiment, the steel used comprises less than 0.5%, limit included, preferably at most 0.05%, limit included, and more preferentially at most 0.02%, limit included, by weight of chromium.

In another embodiment using "stainless" steel, the steel comprises at least 0.5%, limit included, preferably at least 5%, limit included, and more preferentially at least 15%, limit included, by weight of chromium.

Preferably, a stainless steel comprises at least 2%, limit included, preferably at least 4%, limit included, and more preferentially at least 6% by weight of nickel.

Preferably, the polymer matrix is an elastomer matrix, preferably a diene elastomer matrix, i.e. It comprises at least one elastomer, preferably a diene elastomer. "Diene" elastomer (or, without distinction, rubber) is understood to mean an elastomer resulting at least in part (that is to say, a homopolymer or a copolymer) from diene monomer(s) (i.e., monomers bearing two conjugated or non-conjugated carbon-carbon double bonds). "Isoprene elastomer" is intended to mean an isoprene homopolymer or copolymer, in other words a diene elastomer selected from the group consisting of natural rubber (NR), synthetic polyisoprenes (IRs), various isoprene copolymers and the mixtures of these elastomers.

The diene elastomer is preferentially selected from the group consisting of polybutadienes (BRs), natural rubber (NR), synthetic polyisoprenes (IRs), butadiene/styrene copolymers (SBRs), isoprene/butadiene copolymers (BIRs), isoprene/styrene copolymers (SIRs), butadiene/styrene/isoprene copolymers (SBIRs) and the mixtures of these elastomers. A preferred embodiment consists in using an "isoprene" elastomer, that is to say an isoprene homopolymer or copolymer, in other words a diene elastomer selected from the group consisting of natural rubber (NR), synthetic polyisoprenes (IRs), the various copolymers of isoprene and the mixtures of these elastomers. The isoprene elastomer is preferably natural rubber or a synthetic polyisoprene of the cis-1,4 type.

The polymer matrix may contain a single or several diene elastomer(s), and also all or some of the additives usually employed in the matrices intended for the manufacture of tyres, such as, for example, reinforcing fillers such as carbon black or silica, coupling agents, anti-ageing agents, antioxidants, plasticizers or extender oils, whether the latter are aromatic or non-aromatic in nature (notably oils that are very slightly aromatic, if at all, for example of the naphthene or paraffin type, with high or preferably low viscosity, MES or TDAE oils), plasticizing resins with a high glass transition temperature (higher than 30° C.), agents that improve the processability of the compositions in the uncured state, tackifying resins, anti-reversion agents, methylene acceptors and donors such as HMT (hexamethylenetetramine) or H3M (hexamethoxymethylmelamine) for example, reinforcing resins (such as resorcinol or bismaleimide), known adhesion promoter systems of the metal salt type, for example, notably cobalt salts, nickel salts or lanthanide salts, and a crosslinking or vulcanization system.

Preferably, the system for crosslinking the polymer matrix is a system referred to as a vulcanization system, that is to say one based on sulfur (or on a sulfur-donating agent) and a primary vulcanization accelerator. Various known secondary vulcanization accelerators or vulcanization activators may be added to this basic vulcanization system. Sulfur is used at a preferred content of between 0.5 and 10 phr, and the primary vulcanization accelerator, for example a sulfenamide, is used at a preferred content of between 0.5 and 10 phr. The content of reinforcing filler, for example of carbon black and/or silica, is preferably greater than 30 phr, notably between 30 and 100 phr. The term "phr" is understood, in a manner known to a person skilled in the art, to mean per hundred units of weight of elastomer.

All carbon blacks, especially blacks of the HAF, ISAF or SAF type, conventionally used in tyres ("tyre-grade" blacks) are suitable as carbon blacks. Mention will more particularly be made, among the latter, of the carbon blacks of 300, 600 or 700 (ASTM) grade (for example, N326, N330, N347, N375, N683 or N772). Precipitated or fumed silicas having a BET surface area of less than 450 $m^2/g$, preferably of 30 to 400 $m^2/g$, are especially suitable as silicas.

A person skilled in the art will know, in light of the present description, how to adjust the formulation of the rubber compositions in order to achieve the desired levels of properties (especially modulus of elasticity), and how to adapt the formulation to suit the specific application envisaged.

Preferably, each polymer matrix, whether it is that of the straight ply or of the angle ply, has, in the crosslinked state, a secant tensile modulus, at 10% elongation, which is between 4 and 25 MPa, more preferentially between 4 and 20 MPa; values of notably between 5 and 15 MPa have proved to be particularly suitable. Modulus measurements are carried out under tension, unless otherwise indicated, in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with the standard ASTM D 1349 of 1999).

In one preferred embodiment, the density of metallic monofilaments ranges from 120 to 180 metallic monofilaments per decimetre, more preferentially from 130 to 170 metallic monofilaments per decimetre.

In a manner known to a person skilled in the art, the density of reinforcing elements, for example metallic monofilaments, is the number of reinforcing elements arranged next to one another per unit of length (here per decimetre) along a direction perpendicular to the direction along which the reinforcing elements extend.

A further subject of the invention is a tyre comprising at least one straight ply and/or angle ply as described above.

The invention applies particularly to tyres intended to be fitted onto motor vehicles of the passenger type, SUVs ("Sport Utility Vehicles"), two-wheel vehicles (especially bicycles and motorcycles), aircraft, or industrial vehicles chosen from vans, "heavy-duty" vehicles—that is to say underground trains, buses, heavy road transport vehicles (lorries, tractors, trailers), off-road vehicles, such as agricultural or civil engineering machines—and other transport or handling vehicles.

Preferably, the tyre comprises a crown surmounted by a tread, two sidewalls, two beads, each sidewall connecting each bead to the crown, a carcass reinforcement that is anchored in each of the beads and extends through the sidewalls as far as into the crown, a crown reinforcement that is radially interposed between the carcass reinforcement and the tread, the crown reinforcement comprising a straight ply and/or angle ply as described above.

More preferentially, the crown reinforcement comprises a working reinforcement comprising at least one angle ply, preferably two angle plies, as described above and a hoop reinforcement radially interposed between the working reinforcement and the tread.

More preferentially still, the hoop reinforcement comprises at least one hooping textile reinforcing element.

In one preferred embodiment, the density of hooping textile reinforcing elements ranges from 80 to 120 reinforcing elements per decimetre and more preferentially from 90 to 110 reinforcing elements per decimetre.

Advantageously, each hooping textile reinforcing element has a thermal contraction TC after 2 min at 185° C. such that TC<7.5%. In other words this is the relative contraction of these hooping textile reinforcing elements which, by definition, is less than 7.5% under the test conditions listed hereinafter. TC is preferably less than 3.5%, more preferentially less than 3%, which values have proven to be optimal for the manufacturing and dimensional stability of the tyres, particularly during the phases of curing and cooling thereof.

The parameter TC is measured, unless specified otherwise, in accordance with the standard ASTM D1204-08, for example on an apparatus of the "TESTRITE" type under what is known as a standard pretension of 0.5 cN/tex (which is therefore expressed with respect to the titer or linear density of the sample tested). At constant length, the maximum force of contraction (denoted $F_C$) is also measured using the above test, this time at a temperature of 180° C. and under 3% elongation. This force of contraction $F_C$ is preferably greater than 20 N (newtons). A high force of contraction has proven to be particularly beneficial to the hooping capability of the hooping textile reinforcing elements made of heat-shrinkable textile material with respect to the crown reinforcement of the tyre when the latter heats up under high running speed.

The above parameters TC and $F_c$ can be measured without distinction on the initial adhesive-coated hooping textile reinforcing elements before they are incorporated into the ply and the tyre or alternatively can be measured on these hooping textile reinforcing elements once they have been extracted from the vulcanized tyre and preferably "derubberized" (i.e. stripped of the rubber which coats them).

Any heat-shrinkable textile material that satisfies the contraction features TC mentioned hereinabove is suitable. For preference, this heat-shrinkable textile material is selected from the group consisting of polyamides, polyesters and polyketones. Among the polyamides, mention may be made notably of the polyamides 4,6, 6, 6,6, 11 or 12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). Hybrid reinforcers made up of two (at least two) different materials such as aramid/nylon, aramid/polyester, aramid/polyketone hybrid cords, for example, can also be used provided that they satisfy the recommended TC feature. According to one particularly preferred embodiment, the heat-shrinkable textile material is a polyester, notably PET or PEN, very particularly a PET. More preferably still, the polyester used is an HMLS (High Modulus Low Shrinkage) PET.

Another subject of the invention is a process for manufacturing a straight ply as described above, the process comprising a calendering step during which:

the metallic monofilaments are arranged next to one another so as to alternate one or more metallic monofilaments of the first group with one or more metallic monofilaments of the second group;

the metallic monofilaments are embedded in the polymer matrix.

Preferably, the process comprises, prior to the calendering step, a straightening step in which the residual stresses of each metallic monofilament are reduced by exerting forces substantially perpendicularly to the main axis of the metallic monofilament.

The straightening makes it possible to reduce the bend of the metallic monofilament. The bend is generated by the presence of residual compressive stresses at the surface of the metallic monofilament. If these residual compressive stresses are unevenly distributed, this leads to localized imbalance in the stresses on either side of the main axis of the metallic monofilament and therefore to a bend which is increasingly pronounced the greater the unevenness of the distribution and the greater the difference in the values of the residual compressive stresses located on either side of the main axis.

The straightening aimed at reducing, or even eliminating, residual stresses can be performed in various ways. One way known to those skilled in the art is to use torsion straightening as described in WO2015014510. However, such straightening greatly limits the run speed of the metallic monofilament, and therefore the speed at which it can be produced. Specifically, because of the torsion that needs to be applied to the metallic monofilament and which needs to be high enough to reduce the residual stresses, the run speed of the metallic monofilament is less than 300 m·min$^{-1}$, and more generally of the order of 250 m·min$^{-1}$. In the embodiment in which the straightening step is performed by applying bending forces perpendicularly to the main axis of the metallic monofilament and tensile forces along the main axis of the metallic monofilament, rather than torsional forces, the run speed of the metallic monofilament, and therefore the speed at which it can be produced, can be far higher, notably greater than 500 m·min$^{-1}$, and generally greater than 600 m·min$^{-1}$.

Furthermore, the use of torsion straightening causes the metallic monofilament to become wavy. During manufacture of the ply, the metallic monofilaments are arranged parallel and next to one another. Because of the aforementioned waviness, it sometimes happens that two mutually adjacent metallic monofilaments touch, this being unacceptable. This is because during repeated loadings of the ply during operation of the tyre, the two metallic monofilaments in contact with one another will rub on one another and become prematurely worn.

In one preferred embodiment, the forces are exerted by means of a straightening device comprising:

a succession of a first series of presser elements a succession of a second series of presser elements the presser elements of the first series exerting forces on the metallic monofilament in the opposite direction to the presser elements of the second series.

Advantageously, each presser element comprises a pulley rotatably mounted about an axis, the axes of the presser elements of each first and second series being substantially aligned with one another along respectively first and second directions substantially parallel to the run direction of the metallic monofilament.

In one particularly preferred embodiment, the forces are exerted by means of first and second straightening devices, each first and second straightening device comprising:

a succession of a first series of presser elements a succession of a second series of presser elements the presser elements of the first series of each first and second straightening device exerting forces on the metallic monofilament in the opposite direction to the presser elements respectively of the second series of each first and second straightening device.

Advantageously, the presser elements of the first straightening device exert their forces along a direction substantially perpendicular to the direction along which the presser elements of the second straightening device exert their forces.

Preferably, after the straightening step, each metallic monofilament is stored on a storage reel, each storage reel comprising an indicator as to whether the metallic monofilament belongs to the first or second group of metallic monofilaments.

Preferably, after the straightening step, each metallic monofilament is stored on a storage reel, each storage reel comprising the value of the torsional elastic deformation of the metallic monofilament.

Advantageously, the ply comprises m successions of $Ni \geq 1$ metallic monofilaments of the first group, i ranging from 1 to m, and n successions of $Mj \geq 1$ metallic monofilaments of the second group, j ranging from 1 to n.

In one embodiment in which each succession of metallic monofilament(s) comprises the same number of metallic monofilament(s), Ni=N for each succession of $Ni \geq 1$ metallic monofilaments of the first group and/or Mj=M for each succession of $Mj \geq 1$ metallic monofilaments of the second group. Preferentially, N=M.

In another embodiment, there are at least two values k and k' between 1 and m, such that $Nk \neq Nk'$ and/or there are at least two values I and I' between 1 and n, such that $MI \neq MI'$.

Another subject of the invention is a process for manufacturing an angle ply as described above extending along a main direction, in which:
several strips are cut from a ply according to the invention so that each strip extends along a main direction and so that the metallic monofilaments of each strip make an angle of between 10° and 40° with the main direction of the strip,
two ends of at least two strips obtained previously are joined so as to obtain the ply in which the metallic monofilaments make an angle of between 10° and 40° with the main direction of the ply.

BRIEF DESCRIPTION OF THE DRAWINGS

The invention will be better understood from reading the following description, given solely by way of non-limiting example and with reference to the drawings in which.

DETAILED DESCRIPTION

In the following description, when the term "radial" is used, it is appropriate to make a distinction between several different uses of the word by a person skilled in the art. Firstly, the expression refers to a radius of the tyre. It is within this meaning that a point P1 is said to be "radially inside" a point P2 (or "radially on the inside" of the point P2) if it is closer to the rotation axis of the tyre than the point P2. Conversely, a point P3 is said to be "radially outside" a point P4 (or "radially on the outside" of the point P4) if it is further away from the rotation axis of the tyre than the point P4. Progress will be said to be "radially inwards (or outwards)" when it is in the direction of smaller (or larger) radii. It is this sense of the word that applies also when radial distances are being discussed.

On the other hand, a reinforcing element or a reinforcement is said to be "radial" when the reinforcing element or the reinforcing elements of the reinforcement make an angle greater than or equal to 65° and less than or equal to 90° with the circumferential direction.

An "axial" direction is a direction parallel to the axis of rotation of the tyre. A point P5 is said to be "axially inside" a point P6 (or "axially on the inside" of the point P6) if it is closer to the median plane M of the tyre than the point P6. Conversely, a point P7 is said to be "axially outside" a point P8 (or "axially on the outside" of the point P8) if it is further away from the median plane M of the tyre than the point P8.

The "median plane" M of the tyre is the plane which is normal to the axis of rotation of the tyre and which is situated equidistantly from the annular reinforcing structures of each bead.

A "circumferential" direction is a direction which is perpendicular both to a radius of the tyre and to the axial direction.

Furthermore, any range of values denoted by the expression "from a to b" means the range of values ranging from the end point "a" to the end point "b", i.e. including the strict end points "a" and "b".

Tyre and Angle Plies According to the Invention

A frame of reference X, Y, Z corresponding to the usual respectively axial (X), radial (Y) and circumferential (Z) directions of a tyre has been depicted in the figures.

Figure 1:
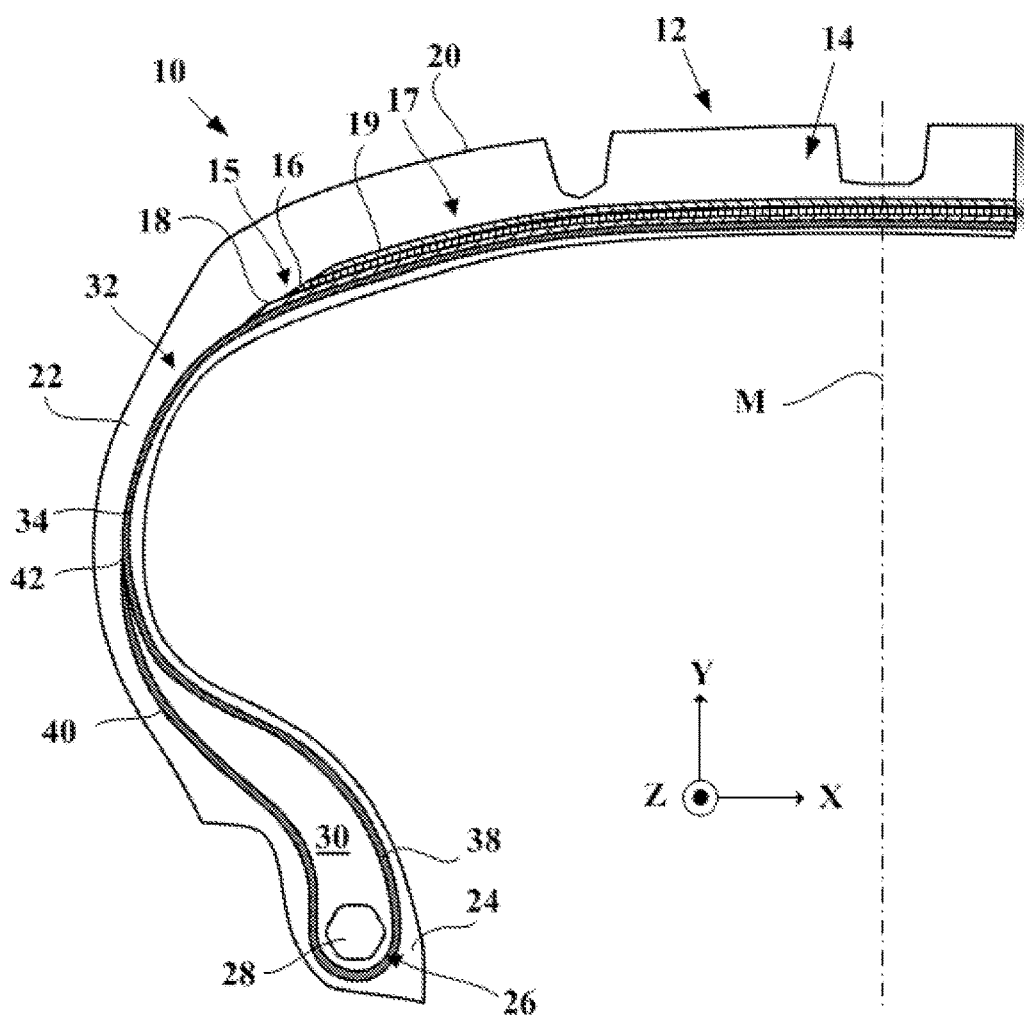
FIG. 1 illustrates a tyre according to the invention.

FIG. 1 depicts a tyre, in this case a pneumatic tyre, in accordance with a first embodiment of the invention and denoted by the general reference 10. The tyre 10 substantially exhibits revolution about an axis substantially parallel to the axial direction X. The tyre 10 here is intended for a passenger vehicle.

The tyre 10 comprises a crown 12 comprising a crown reinforcement 14 comprising a working reinforcement 15 comprising two working plies 16, 18 of reinforcing elements according to the invention and a hoop reinforcement 17 comprising a hooping ply 19. The crown reinforcement 14 is surmounted by a tread 20. In this case, the hoop reinforcement 17, in this case the hooping ply 19, is radially interposed between the working reinforcement 15 and the tread 20.

Two sidewalls 22 extend the crown 12 radially inwards. The tyre 10 further comprises two beads 24 radially on the inside of the sidewalls 22 and each comprising an annular reinforcing structure 26, in this instance a bead wire 28, surmounted by a mass of filling rubber 30, and also a radial carcass reinforcement 32. The crown reinforcement 14 is radially interposed between the carcass reinforcement 32 and the tread 20. Each sidewall 22 connects each bead 24 to the crown 14.

The carcass reinforcement 32 preferably comprises a single carcass ply 34 of radial textile reinforcing elements. The carcass reinforcement 32 is anchored to each of the beads 24 by being turned up around the bead wire 28, so as to form, within each bead 24, a main strand 38 extending from the beads 24 through the sidewalls 22 as far as into the crown 12, and a turn-up strand 40, the radially outer end 42 of the turn-up strand 40 being radially on the outside of the annular reinforcing structure 26. The carcass reinforcement 32 thus extends from the beads 24 through the sidewalls 22 as far as into the crown 12. In this embodiment, the carcass reinforcement 32 also extends axially through the crown 12.

Each working ply 16, 18, hooping ply 19 and carcass ply 34 comprises a polymer matrix in which the reinforcing elements of the corresponding ply are embedded. Each polymer matrix, here an elastomer matrix, of the working plies 16, 18, hooping ply 19 and carcass ply 34 is made from a conventional composition for the calendering of reinforcing elements conventionally comprising a diene elastomer, for example natural rubber, a reinforcing filler, for example carbon black and/or silica, a crosslinking system, for example a vulcanization system, preferably comprising sulfur, stearic acid and zinc oxide, and possibly a vulcanization accelerator and/or retarder and/or various additives.

The hooping ply 19 comprises hooping textile reinforcing elements that form an angle at most equal to 10°, preferably ranging from 5° to 10°, with the circumferential direction Z of the tyre 10. In this case, each hooping textile reinforcing element is made from a heat-shrinkable material, here made of polyamide 66. Each hooping textile reinforcing element comprises two multifilament strands made from a heat-shrinkable material, here made of polyamide 66, which are individually overtwisted at 250 turns·m$^{-1}$ in one direction then twisted together at 250 turns·m$^{-1}$ in the opposite direction. The two multifilament strands are helically wound around one another. Each multifilament strand has a titer equal to 140 tex. The thermal contraction TC of each hooping textile reinforcing element is approximately equal to 7%.

The carcass ply 34 comprises radial carcass textile reinforcing elements that form an angle ranging from 65° to 90° with the circumferential direction Z of the tyre 10. In this case, each carcass textile reinforcing element comprises two multifilament strands made of polyester, here made of PET, which are individually overtwisted at 420 turns·m$^{-1}$ in one direction then twisted together at 420 turns·m$^{-1}$ in the opposite direction. The two multifilament carcass strands are helically wound around one another. Each multifilament carcass strand has a titer equal to 144 tex.

Figure 2:
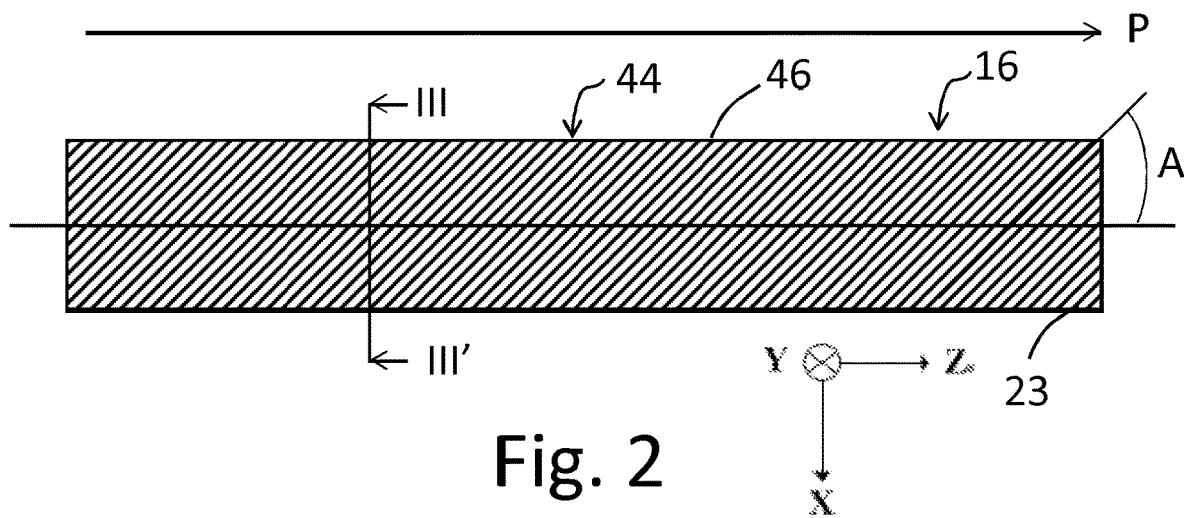
FIG. 2 illustrates an angle ply of the tyre from FIG. 1 according to a first embodiment of the invention.

The working ply 16 according to the invention has been represented in FIG. 2. The working ply 16 extends along a main direction P. Once the working ply 16 is incorporated into the tyre 10, the main direction P of the working ply 16 is substantially parallel to the circumferential direction Z of the tyre 10. The working ply 16 comprises metallic reinforcing elements 44. Each reinforcing element 44 comprises, here consists of, a metallic monofilament 46 embedded in a polymer matrix 23 as described above.

The metallic monofilaments 46 of the working ply 16 are substantially parallel to one another and make an angle A ranging from 10° to 40°, preferably ranging from 20° to 30° and here equal to 26° with the circumferential direction Z of the tyre 10. Each metallic monofilament 46 is here made of steel coated with a protective coating comprising for example brass or zinc. Each metallic monofilament 46 has a diameter ranging from 0.10 mm to 0.50 mm, preferably from 0.20 mm to 0.40 mm and more preferentially from 0.25 mm to 0.35 mm, and here equal to 0.30 mm.

The working ply 18 according to the invention has features identical to those of the working ply 16 except for the orientation of the metallic monofilaments 46 that form an angle B ranging from 10° to 40°, preferably ranging from 20° to 30° and here equal to 26°, the angle B being opposite to the angle A. In other words, the reinforcing elements of the working plies 16 and 18 are crossed.

Owing to the angle A or B that each metallic monofilament 46 makes with the circumferential direction Z of the tyre 10, each working ply 16, 18 is said to be an angle ply.

Figure 3:
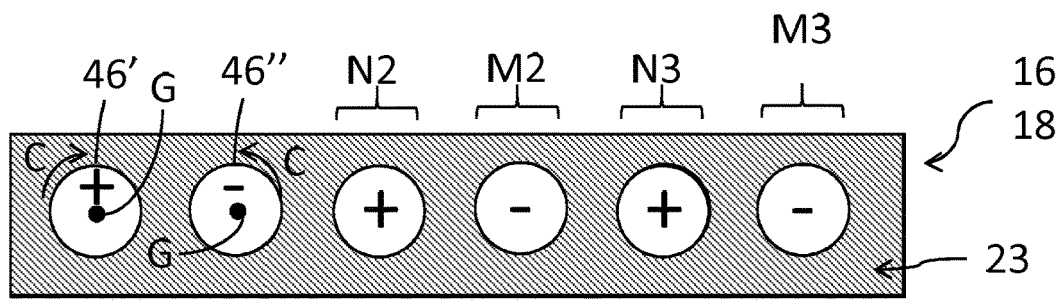
FIG. 3 illustrates the angle ply from FIG. 2 along the cutting plane III-III'.

As represented in FIG. 3, each working angle ply 16, 18 comprises first and second groups of metallic monofilaments 46' and 46". Each metallic monofilament 46', 46" has a main axis G that is coincident with its axis of revolution. Each metallic monofilament 46' of the first group has a positive torsional elastic deformation C in a first direction about its main axis, for example in the clockwise direction in FIG. 3. Each metallic monofilament 46" of the second group has a negative torsional elastic deformation C in a second direction about its main axis, for example the anticlockwise direction in FIG. 3. The first direction is therefore opposite to the second direction.

In each working angle ply 16, 18, the metallic monofilaments 46', 46" are arranged next to one another so as to alternate one or more metallic monofilaments 46' of the first group with one or more metallic monofilaments 46" of the second group.

Each ply comprises m successions of Ni≥1 metallic monofilaments 46' of the first group, i ranging from 1 to m, and n successions of Mj≥1 metallic monofilaments 46" of the second group, j ranging from 1 to n. Each succession Ni is adjacent to at least one succession Mj and, with the exception of the successions located at the edges of the ply, each succession Ni, Mj is adjacent to two successions, respectively Mj, Ni.

In the embodiment illustrated in FIG. 3, the ply comprises m=3 successions of metallic monofilaments 46' of the first group and n=3 successions of metallic monofilaments 46" of the second group. For each succession of Ni≥1 metallic monofilaments 46' of the first group, N1=N2=N3=1. For each succession of Mj≥1 metallic monofilaments 46" of the second group, M1=M2=M3=1. Thus, the metallic monofilaments 46', 46" are arranged next to one another so as to alternate one metallic monofilament 46' of the first group with one metallic monofilament 46" of the second group.

The absolute value of the torsional elastic deformation C of each metallic monofilament 46', 46" is such that |C|≤6 turns per ten metres of metallic monofilament 46', 46".

The mean S of the torsional elastic deformations of the monofilaments of the ply is such that −0.25 turn per ten metres of metallic monofilament≤S≤+0.25 turn per ten metres of metallic monofilament.

In the embodiment illustrated in FIG. 3, (which illustrates an angle ply comprising a reduced number of metallic monofilaments for the purposes of clarity and conciseness of the disclosure of the invention), each metallic monofilament 46' of the first group has a torsional elastic deformation such that C<+6 turns per ten metres of metallic monofilament 46', preferably C<+5 turns per ten metres of metallic monofilament 46', in this case C=+3.5 turns per ten metres of metallic monofilament 46'. Each metallic monofilament 46" of the second group has a torsional elastic deformation such that C>−6 turns per ten metres of metallic monofilament 46", preferably C>−5 turns per ten metres of metallic monofilament 46" (|C|<6 turns per ten metres of metallic monofilament 46", |C|<5 turns per ten metres of metallic monofilament 46"), in this case C=−3.1 turns per ten metres of metallic monofilament 46" (|C|=3.1 turns per ten metres of metallic monofilament 46"). Thus, the mean S is equal to S=3×(+3.5−3.1)/6=+0.20 turns per ten metres of metallic monofilament 46', 46".

Figure 4:
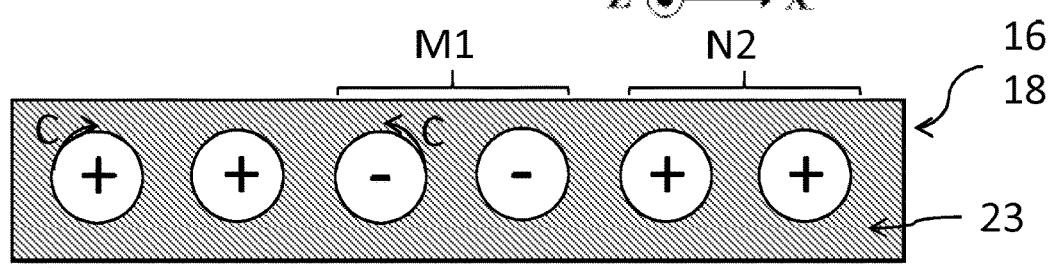
FIGS. 4 to 6 illustrate angle plies respectively according to second, third and fourth embodiments.
Figure 5:
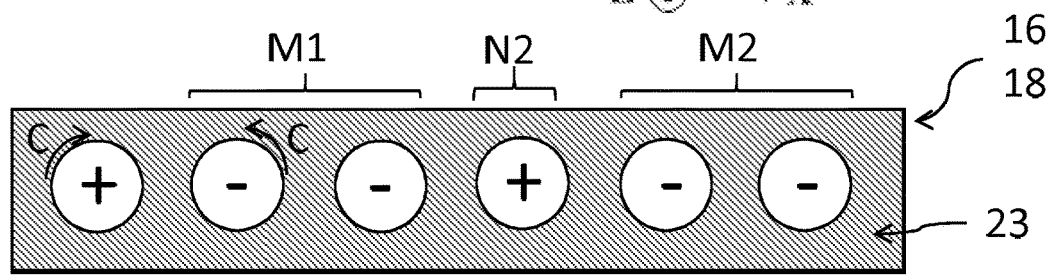
Figure 6:
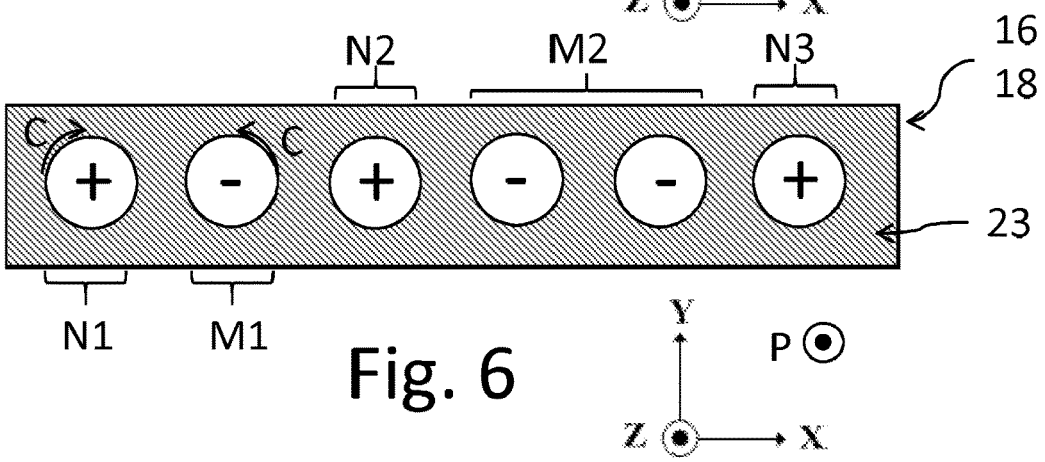

FIGS. 4, 5 and 6 respectively depict second, third and fourth embodiments of angle plies according to the invention. Elements similar to those of the first embodiment are denoted by identical references.

With reference to FIG. 4, unlike the first embodiment, the angle ply of the second embodiment comprises m=2 successions of metallic monofilaments 46' of the first group and n=1 succession of metallic monofilaments 46" of the second group. For each succession of Ni≥1 metallic monofilaments 46' of the first group, N1=N2=2. For the succession of Mj≥1 metallic monofilaments 46" of the second group, M1=2. Thus, the metallic monofilaments 46', 46" are arranged next to one another so as to alternate two metallic monofilaments 46' of the first group with two metallic monofilaments 46" of the second group.

With reference to FIG. 5, unlike the first embodiment, the angle ply of the third embodiment comprises m=2 successions of metallic monofilaments 46' of the first group and n=2 successions of metallic monofilaments 46" of the second group. For each succession of Ni≥1 metallic monofilaments 46' of the first group, N1=N2=1. For each succession of Mj≥1 metallic monofilaments 46" of the second group, M1=M2=2. Thus, the metallic monofilaments 46', 46" are arranged next to one another so as to alternate one metallic monofilament 46' of the first group with two metallic monofilaments 46" of the second group.

With reference to FIG. 6, unlike the first embodiment, the angle ply of the third embodiment comprises m=3 successions of metallic monofilaments 46' of the first group and n=2 successions of metallic monofilaments 46" of the second group. Unlike the preceding embodiments in which, for each succession, Ni=N and Mj=M, there are, in the embodiment from FIG. 6, at least two values k and k' between 1 and m, such that Nk≠Nk' and/or there are at least two values l and l' between 1 and n, such that Ml≠Ml'. In this case, for each succession of Ni≥1 metallic monofilaments 46' of the first group, N1=N2=N3=1 and there are at least two values l and l' between 1 and n, such that Ml≠Ml'. Here, M1=1 and M2=2. A variant could also be envisaged in which instead of having Ni=N for i ranging from 1 to m, there would be at least two values k and k' between 1 and m, such that Nk≠Nk'.

Straight Ply According to the Invention, Process for Manufacturing a Straight Ply and an Angle Ply According to the Invention A process for manufacturing straight and angled plies according to the invention will now be described with reference to FIGS. 7 to 11.

Figure 7:
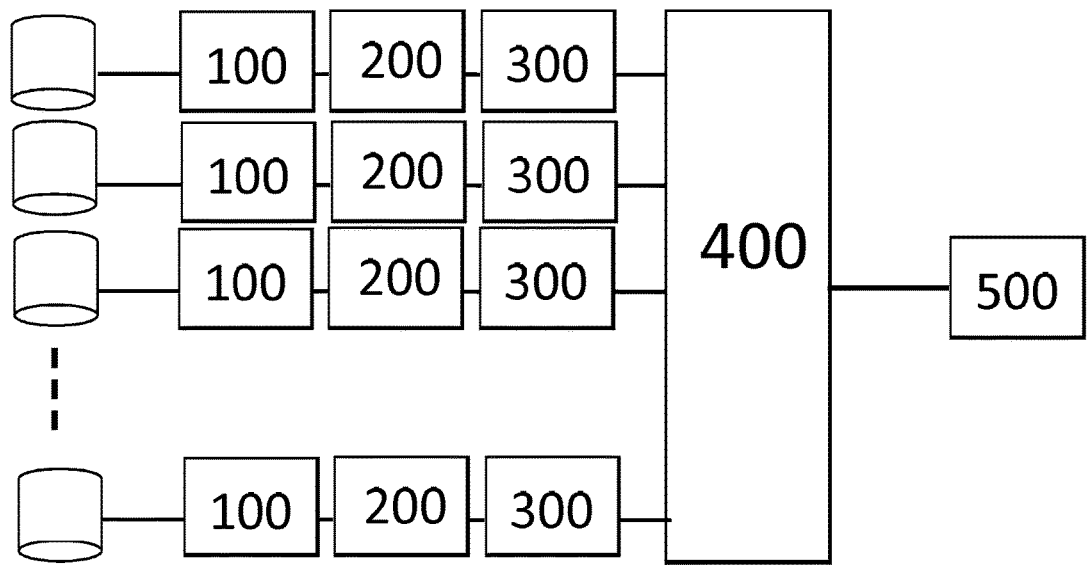
FIG. 7 is a diagram illustrating the steps of the process according to the invention.
Figure 8:
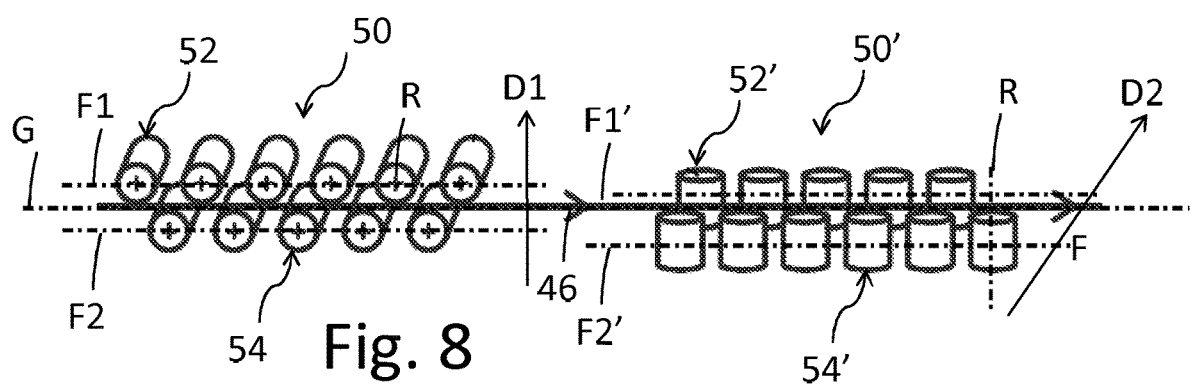
FIG. 8 illustrates first and second devices for straightening metallic monofilaments of a ply according to the invention.
Figure 9:
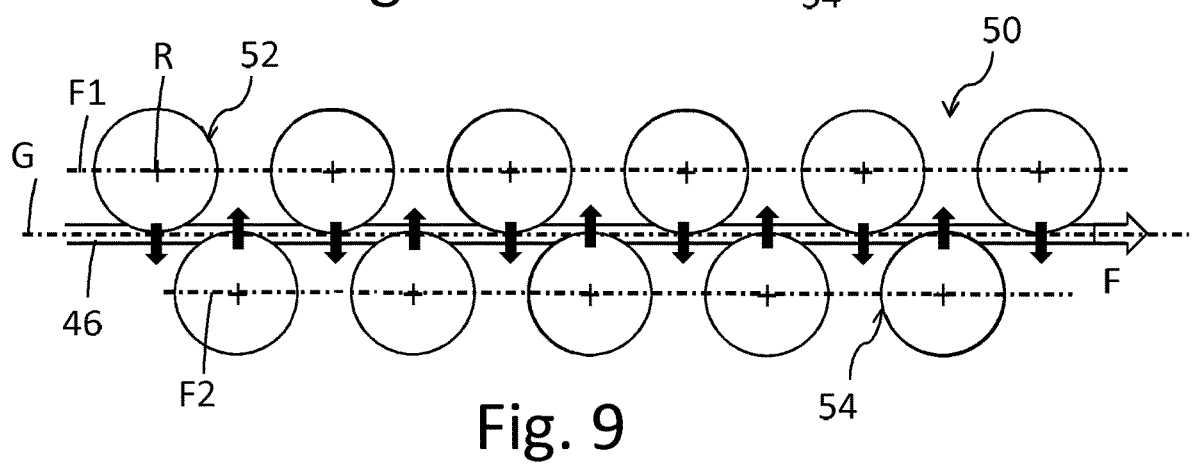
FIG. 9 illustrates the first straightening device from FIG. 8.

With reference to FIG. 7, during a step 100, a monofilament 46 with a diameter d of between 0.10 mm and 0.50 mm is manufactured from a metallic monofilament with a diameter D of between 0.75 mm and 2.5 mm. In order to do this, the first step 100 comprises an uninterrupted series of steps $100_1$-$100_p$ of drawing the metallic monofilament from a diameter D to a diameter d. Each step $100_1$-$100_p$ consists in passing the monofilament through a die of diameter $d'_i$, being between 1 and p, $d'_i$, being between d and D, the diameter $d'_i$, of each die decreasing in the run direction of the metallic monofilament. Such a step 100 is well known to a person skilled in the art.

Next, the process comprises first and second steps 200 and 300 of straightening the metallic monofilament 46 of diameter d in order to reduce the residual stresses present at the surface of the metallic monofilament 46. During these steps 200 and 300, the residual stresses of each metallic monofilament 46 are reduced by exerting forces substantially perpendicularly to the main axis G of the metallic monofilament 46 by means of first and second straightening devices 50, 50' illustrated in FIG. 8. The first straightening device is illustrated in detail in FIG. 9.

Each first and second straightening device 50, 50' comprises a succession of a first series of presser elements 52, 52' and a succession of a second series of presser elements 54, 54'.

The presser elements 52, 52' of the first series of each first and second straightening device 50, 50' exert forces on the metallic monofilament 46 in the opposite direction to the presser elements 54, 54' respectively of the second series of each first and second straightening device 50, 50'. These forces have been represented by arrows in FIG. 9.

The presser elements 52, 54 of the first straightening device 50 exert their forces along a direction D1 substantially perpendicular to the direction D2 along which the presser elements 52', 54' of the second straightening device 50' exert their forces.

In this case, each presser element 52, 52', 54, 54' comprises a pulley rotatably mounted about an axis R. The axes R of the presser elements 52, 54 of the first and second series of the first straightening device 50 are substantially aligned with one another along respectively first and second directions F1, F2 substantially parallel to the run direction F of the metallic monofilament 46. Similarly, the axes of the presser elements 52', 54' of the first and second series of the second straightening device 50' are substantially aligned with one another along respectively first and second directions F1', F2' substantially parallel to the run direction F of the metallic monofilament 46.

Next, in a subsequent storage step (not illustrated), after the straightening steps 200, 300, each metallic monofilament 46 is stored on a storage reel. Each storage reel comprises an indicator as to whether the metallic monofilament belongs to the first or second group and also the value of the torsional elastic deformation of the metallic monofilament. In this case, when the metallic monofilament 46' has a torsional elastic deformation in the first direction, here the clockwise direction, a green sticker is affixed to the storage reel and the value of the torsional elastic deformation is written thereon, +3 for the first embodiment from FIG. 3. Similarly, when the metallic monofilament 46" has a torsional elastic deformation in the second direction, here the anticlockwise direction, a red sticker is affixed to the storage reel and the value of the torsional elastic deformation is written thereon, −2 for the first embodiment from FIG. 3.

Next, in a step 400, the metallic monofilaments 46', 46" are arranged next to one another so as to alternate one or more metallic monofilaments 46' of the first group with one or more metallic monofilaments 46" of the second group and so as to meet the requirement regarding the mean S of the torsional elastic deformations, namely the mean S of the torsional elastic deformations of the metallic monofilaments 46 being such that −0.25 turn per ten metres of metallic monofilaments≤S≤+0.25 turn per ten metres of metallic monofilaments.

Figure 10:
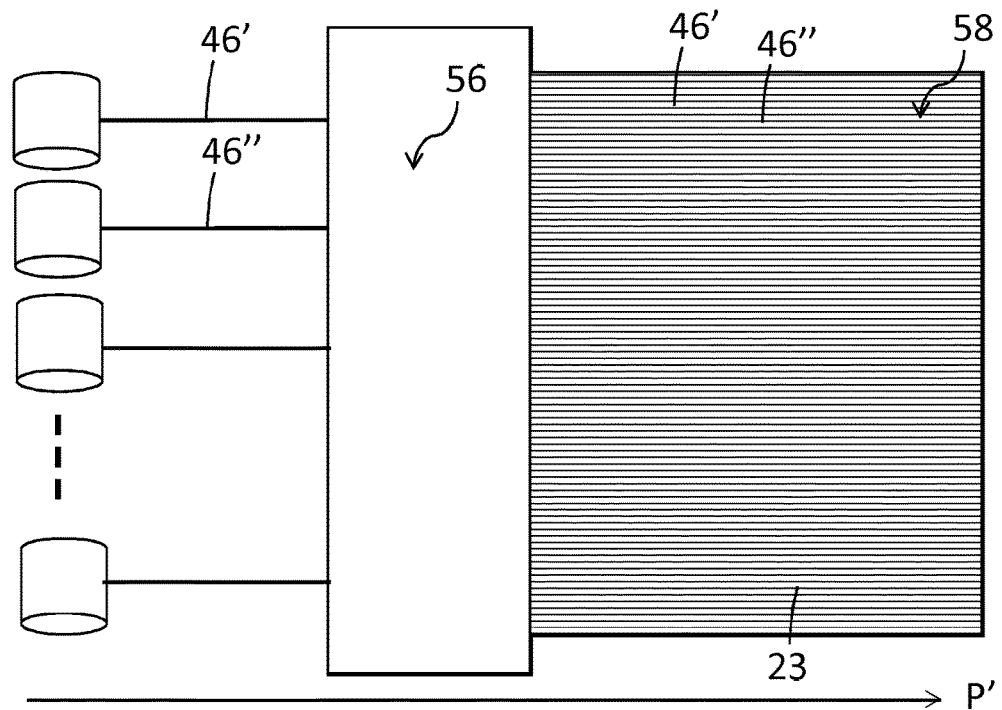
FIG. 10 illustrates a device for manufacturing a straight ply according to the invention.

The metallic monofilaments 46', 46" are embedded in the polymer matrix 23 by means of a calender 56 as is represented in FIG. 10. Such a calendering step and also a suitable calender are in particular described in EP2047962. A straight ply 58 according to the invention is then obtained, in which the metallic monofilaments 46', 46" are substantially parallel to one another and to a main direction P' of the straight ply 58.

Figure 11:
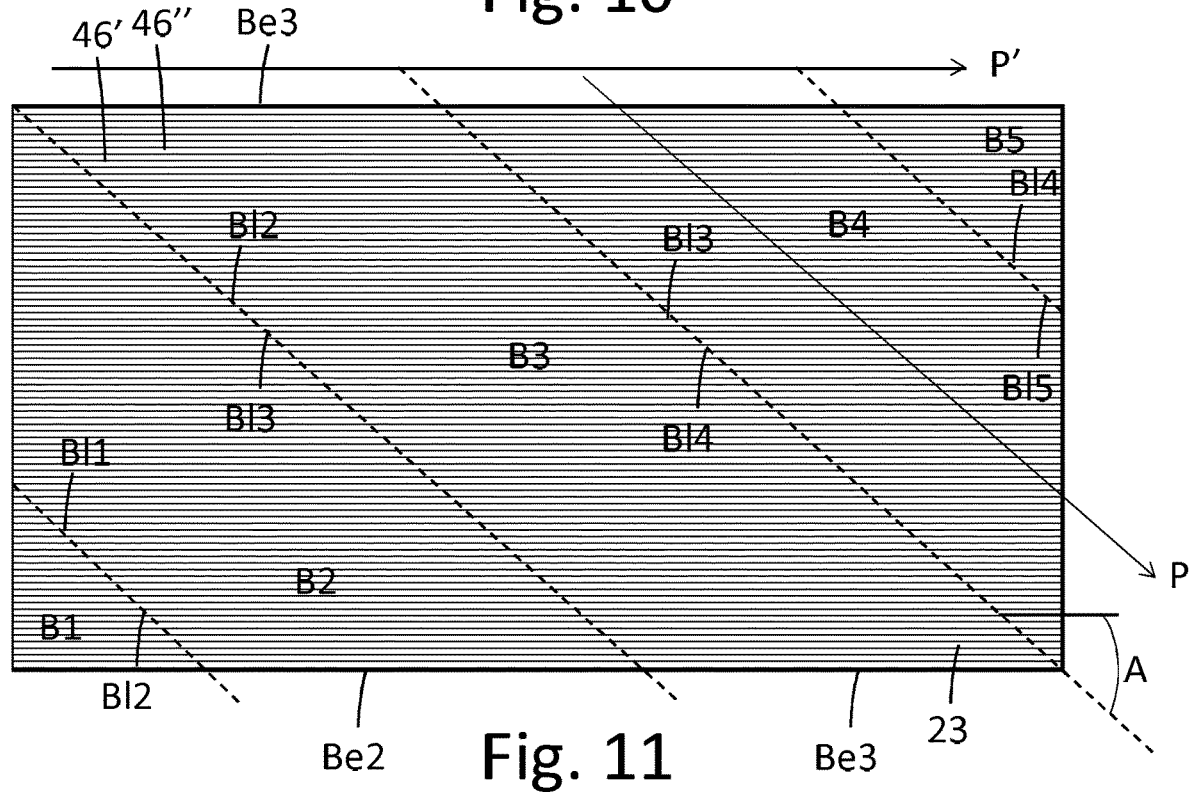
FIG. 11 illustrates a step of cutting strips for manufacturing the angle ply according to the invention of FIGS. 1, 2 and 3 from the straight ply according to the invention manufactured in FIG. 10.

Next, in a step 500 depicted in FIG. 11, the angle ply 16, 18 from FIGS. 2 and 3 is manufactured as described previously from the straight ply 58.

For this, several strips Bi are cut from the straight ply 58 so that each strip Bi extends along the main direction P and so that the metallic monofilaments 46 of each strip Bi make the angle A (or B for the ply 18) of between 10° and 40° with the main direction of the strip Bi, here an angle equal to 26°. Each strip Bi thus obtained has two longitudinal edges Bli and also two ends Bei.

Next, the ends Bei of several strips Bi obtained previously are joined in twos so as to obtain the angle ply 16, 18 in which the metallic monofilaments 46 make an angle of between 10° and 40° with the main direction P of the angle ply.

The invention is not limited to the embodiments described above.

The various embodiments described above may be combined provided that these embodiments are compatible with one another.

The invention claimed is:

1. A ply extending along a main direction P' comprising:
   a polymer matrix; and
   metallic monofilaments embedded in the polymer matrix, the metallic monofilaments being straight and being substantially parallel relative to one another and to the main direction P' of the ply, each metallic monofilament having a main axis G and a torsional elastic deformation C about its main axis G,
   wherein the ply comprises first and second groups of metallic monofilaments, each metallic monofilament of the first group having a torsional elastic deformation C in a first direction about its main axis G, each metallic monofilament of the second group having a torsional elastic deformation C in a second direction about its main axis G, the first direction being opposite to the second direction, and the torsional elastic deformation C being positive in the first direction and negative in the second direction,
   wherein the absolute value of the torsional elastic deformation C of each metallic monofilament is such that |C|≤6 turns per ten meters of metallic monofilament, wherein the mean S of the torsional elastic deformations of the metallic monofilaments of the ply is such that −0.25 turn per ten meters of metallic monofilaments≤S≤+0.25 turn per ten meters of metallic monofilaments, and
   wherein the metallic monofilaments are arranged next to one another so as to alternate one or more metallic monofilaments of the first group with one or more metallic monofilaments of the second group.

2. A tire comprising at least one ply according to claim 1.

3. A ply extending along a main direction P comprising:
   a polymer matrix; and
   metallic monofilaments embedded in the polymer matrix, the metallic monofilaments being straight and being substantially parallel relative to one another and making an angle A of between 10° and 40° with the main direction P of the ply, each metallic monofilament having a main axis G and a torsional elastic deformation C about its main axis G,
   wherein the ply comprises first and second groups of metallic monofilaments, each metallic monofilament of the first group having a torsional elastic deformation C in a first direction about its main axis G, each metallic monofilament of the second group having a torsional elastic deformation C in a second direction about its main axis G, the first direction being opposite to the second direction, and the torsional elastic deformation C being positive in the first direction and negative in the second direction,
   wherein the absolute value of the torsional elastic deformation C of each metallic monofilament is such that |C|≤6 turns per ten meters of metallic monofilament, wherein the mean S of the torsional elastic deformations of the metallic monofilaments of the ply is such that −0.25 turn per ten meters of metallic monofilaments≤S≤+0.25 turn per ten meters of metallic monofilaments, and
   wherein the metallic monofilaments are arranged next to one another so as to alternate one or more metallic monofilaments of the first group with one or more metallic monofilaments of the second group.

4. A tire comprising at least one ply according to claim 3.

5. A process for manufacturing a ply extending along a main direction P' comprising:
   a polymer matrix; and
   metallic monofilaments embedded in the polymer matrix, the metallic monofilaments being straight and being substantially parallel relative to one another and to the main direction P' of the ply, each metallic monofilament having a main axis G and a torsional elastic deformation C about its main axis G,
   wherein the ply comprises first and second groups of metallic monofilaments, each metallic monofilament of the first group having a torsional elastic deformation C in a first direction about its main axis G, each metallic monofilament of the second group having a torsional elastic deformation C in a second direction about its main axis G, the first direction being opposite to the second direction, and the torsional elastic deformation C being positive in the first direction and negative in the second direction,
   wherein the absolute value of the torsional elastic deformation C of each metallic monofilament is such that |C|≤6 turns per ten meters of metallic monofilament, and wherein the mean S of the torsional elastic deformations of the metallic monofilaments of the ply is such that −0.25 turn per ten meters of metallic monofilaments≤S≤+0.25 turn per ten meters of metallic monofilaments,
   said process comprising a calendering step during which the metallic monofilaments are arranged next to one another so as to alternate one or more metallic monofilaments of the first group with one or more metallic monofilaments of the second group.

6. The process according to claim 5, further comprising, prior to the calendering step, a straightening step in which the residual stresses of each metallic monofilament are reduced by exerting forces substantially perpendicularly to the main axis G of the metallic monofilament.

7. The process according to claim 6, wherein the forces are exerted by means of a straightening device comprising:
   a succession of a first series of presser elements; and
   a succession of a second series of presser elements,
   wherein the presser elements of the first series exert forces on the metallic monofilament in the opposite direction to the presser elements of the second series.

8. The process according to claim 7, wherein each presser element comprises a pulley rotatably mounted about an axis R, the axes R of the presser elements of each first and second series being substantially aligned with one another along respectively first and second directions substantially parallel to the run direction F of the metallic monofilament.

9. The process according to claim 7, wherein the forces are exerted by means of first and second straightening devices, each first and second straightening device comprising:
   a succession of a first series of presser elements; and
   a succession of a second series of presser elements,
   wherein the presser elements of the first series of each first and second straightening device exert forces on the metallic monofilament in the opposite direction to the presser elements respectively of the second series of each first and second straightening device.

10. The process according to claim 9, wherein the presser elements of the first straightening device exert their forces along a direction D1 substantially perpendicular to the direction D2 along which the presser elements of the second straightening device exert their forces.

11. A process for manufacturing a ply extending along a main direction comprising the steps of:
   cutting several strips from a ply according to claim 1 so that each strip extends along a main direction P and so that the metallic monofilaments of each strip make an angle A of between 10° and 40° with the main direction P of the strip; and
   joining two ends of at least two strips so as to obtain the ply in which the metallic monofilaments make an angle A of between 10° and 40° with the main direction P of the ply.

* * * * *